United States Patent
Wu

(10) Patent No.: US 7,306,085 B2
(45) Date of Patent: Dec. 11, 2007

(54) CLUTCH DEVICE FOR MOTORCYCLE

(76) Inventor: Shih-Hsiung Wu, No. 406, Ding-Ann Street, An-Nan District, Tainan City (TW)

( * ) Notice: Subject to any disclaimer, the term of this patent is extended or adjusted under 35 U.S.C. 154(b) by 263 days.

(21) Appl. No.: 11/223,987

(22) Filed: Sep. 13, 2005

(65) Prior Publication Data

US 2007/0056827 A1    Mar. 15, 2007

(51) Int. Cl.
*F16D 43/18* (2006.01)
*F16D 13/75* (2006.01)

(52) U.S. Cl. .................... 192/105 CD; 192/30 W; 192/110 R

(58) Field of Classification Search ......... 192/105 CD, 192/105 CE; 188/79.57, 79.59, 184; 267/73
See application file for complete search history.

(56) References Cited

U.S. PATENT DOCUMENTS 603,363 A * 5/1898 Ireland ................. 192/105 CE
1,894,890 A * 1/1933 Rossi .................. 192/105 CD
2,038,450 A * 4/1936 Roesch ................ 192/105 CD
2,401,981 A * 6/1946 Springhorn ........... 192/105 CE

* cited by examiner

*Primary Examiner*—Rodney H. Bonck
(74) *Attorney, Agent, or Firm*—Rosenberg, Klein & Lee

(57) ABSTRACT

A clutch device for a motorcycle includes a body, at least two centrifugal weights pivotably mounted on a side of the body, and at least two springs. Each centrifugal weight includes a through-hole extending from an inner side thereof through the outer periphery face thereof. A spring-attaching member is mounted in the through-hole of each centrifugal weight and includes a first end and a second end that has a screw hole. An adjusting screw is mounted in each spring-attaching member. Each spring includes a first end attached to an associated centrifugal weight and a second end attached to the first end of the spring-attaching member on another centrifugal weight. Each spring-attaching member moves along a longitudinal direction of an associated through-hole when an associated adjusting screw is turned, thereby adjusting tightness of an associated spring.

5 Claims, 4 Drawing Sheets

A-A

CLUTCH DEVICE FOR MOTORCYCLE

BACKGROUND OF THE INVENTION

1. Field of the Invention

The present invention relates to a clutch device. More particularly, the present invention relates to a clutch device for a motorcycle.

2. Description of the Related Art

Motorcycles with continuously variable transmission are popular nowadays. A clutch for a typical continuously variable transmission device comprises three centrifugal weights that are coupled together via three springs. When the centrifugal weights move under the action of centrifugal force, the springs stretch and then to their original positions, thereby changing the speed and the torque of the motorcycle. However, the clutch is an isolated structure such that the whole clutch must be detached for replacement in a case that fatigue or breakage of one or more springs occurs, resulting in inconvenient maintenance. Further, a worker could not directly proceed with adjustment of slackened springs (which slackening often occurs after a period of time of use) without dismantling the clutch while there is no scale or reference for such an adjustment. In other words, the worker has to adjust the springs based on personal experience such that the adjustment result is unsatisfactory and that the motorcycle could not obtain the initial speed and torque. Further, the conventional clutch is liable to deform or malfunction after a period of time, for the conventional clutch is not strong enough to withstand the change in the torque during the centrifugal movement of the centrifugal weights for the purposes of altering the speed and torque of the motorcycle.

SUMMARY OF THE INVENTION

A clutch device for a motorcycle in accordance with the present invention comprises a body, at least two centrifugal weights pivotably mounted on a side of the body, and at least two springs. Each centrifugal weight comprises a clutch plate on an outer periphery face thereof. Each centrifugal weight further comprises a through-hole extending from an inner side thereof through the outer periphery face thereof.

A spring-attaching member is mounted in the through-hole of each centrifugal weight and comprises a first end and a second end that has a screw hole. An adjusting screw is mounted in each spring-attaching member. Each spring comprises a first end attached to an associated centrifugal weight and a second end attached to the first end of the spring-attaching member on another centrifugal weight.

Each spring-attaching member moves along a longitudinal direction of an associated through-hole when an associated adjusting screw is turned, thereby adjusting tightness of an associated spring.

Preferably, each spring-attaching member comprises a scale on an outer periphery thereof, and the body comprises a plurality of openings respectively aligned with the scales of the spring-attaching members. This allows the user to precisely adjust the tightness of the springs.

Preferably, each opening of the body extends along a longitudinal direction of an associated spring to allow removal and replacement of the associated spring via the opening.

Preferably, the through-hole of each centrifugal weight comprises a shoulder portion, and each adjusting screw comprises an enlarged head that abuts against the shoulder portion of the through-hole of an associated centrifugal weight.

Preferably, a fixing ring is fixed to the other side of the body to improve the strength of the body.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
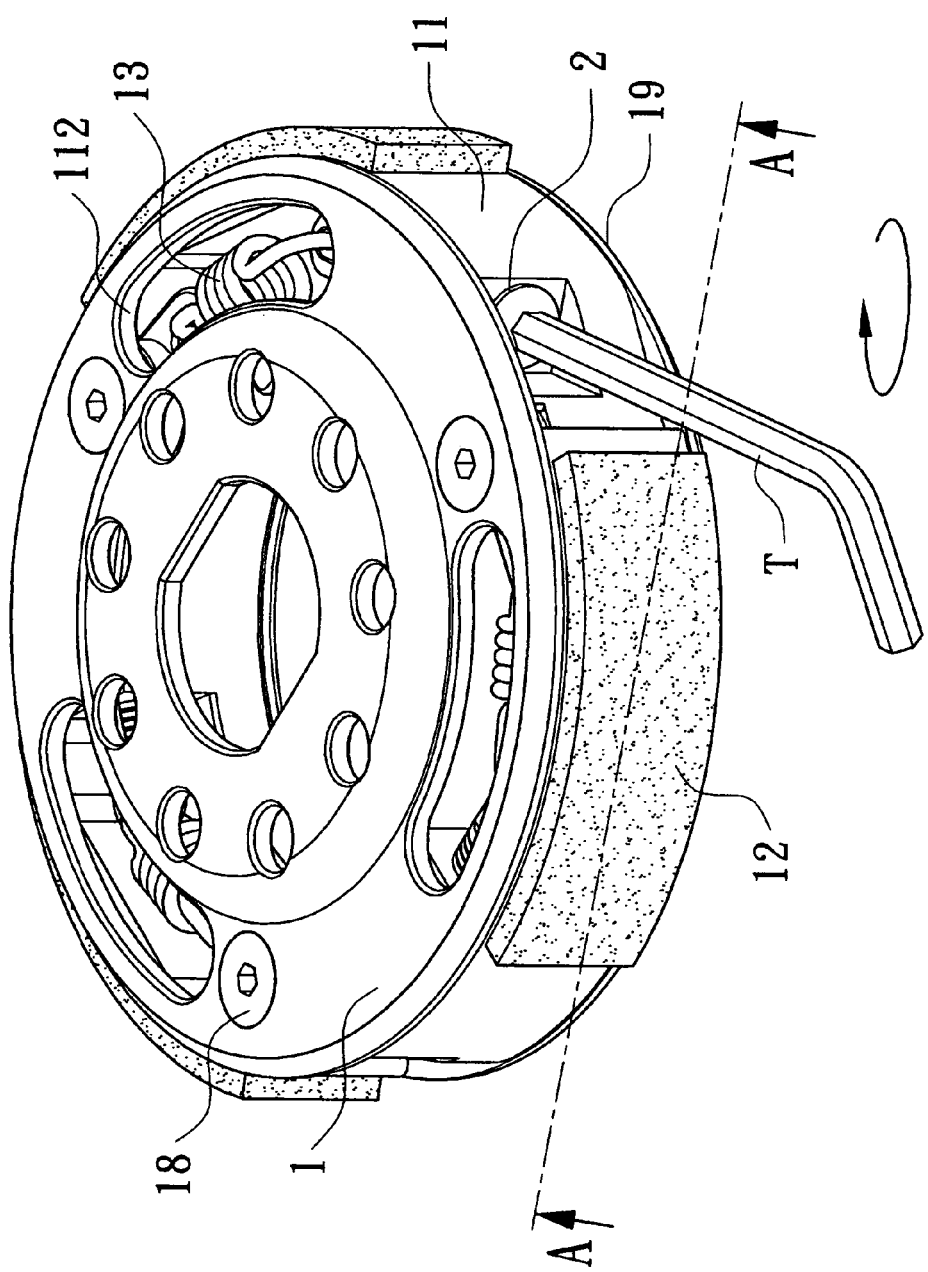
FIG. 1 is a perspective view of a clutch device for a motorcycle in accordance with the present invention.

Referring to FIG. 1, a clutch device for a motorcycle in accordance with the present invention comprises a body 1 and at least two centrifugal weights 11 (three in this embodiment) pivotably mounted on a side of the body 1. A clutch plate 12 is mounted on an outer peripheral face of each centrifugal weight 11. Further, a spring 13 is mounted to an inner side of each centrifugal weight 11.

Each centrifugal weight 11 comprises a through-hole 111 extending from the inner side thereof through the peripheral face thereof. Provided on an end of each centrifugal weight 11 is a hooking portion 15 to which an end of an associated spring 13 is attached. An axle 161 is mounted in a pivotal hole 16 in the end of each centrifugal weight 11 and comprises a screw hole 162. The body 1 comprises a plurality of through-holes 17 each of which is aligned with the screw hole 162 of the axle 161 on an associated centrifugal weight 11, with a screw 18 extending through each through-hole 17 into the screw hole 162 of the axle 161 on an associated centrifugal weight 11. Thus, the axles 161 are fixed on the body 1, and the centrifugal weights 11 are pivotable about the respective axles 161.

The clutch device further comprises an adjusting unit 2 mounted in the through-hole 111 of each centrifugal weight 11. Each adjusting unit 2 comprises a spring-attaching member 21 and an adjusting screw 22. An end of the spring-attaching member 21 is attached to the other end of an associated spring 13, and a screw hole 211 is defined in the other end of the spring-attaching member 21. The adjusting screw 22 is mounted in the screw hole 211 of the spring-attaching member 21 such that rotation of the adjusting screw 22 causes the spring-attaching member 21 to move along a longitudinal direction of the through-hole 111 of the associated centrifugal weight 11. The spring-attaching member 21 comprises a scale 212 on an outer periphery thereof to provide an indication of the extent of adjustment so that a worker may proceed with precise adjustment of each spring 13. Further, the body 1 comprises a plurality of openings 112 respectively aligned with the scales 212 of the spring-attaching members 21.

Figure 3:
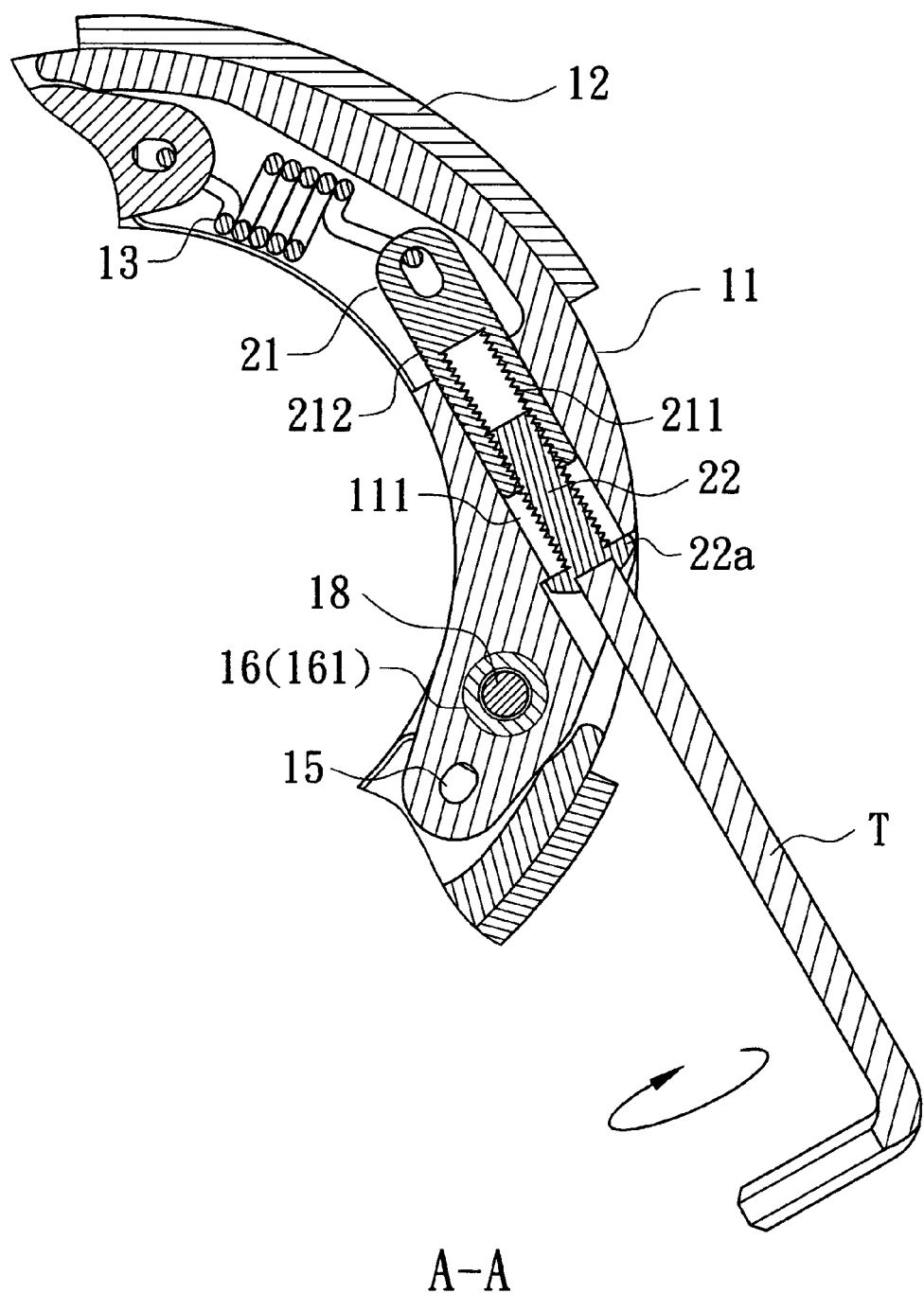
FIG. 3 is a partial sectional view of the clutch device taken along plane A-A in FIG. 1.
Figure 4:
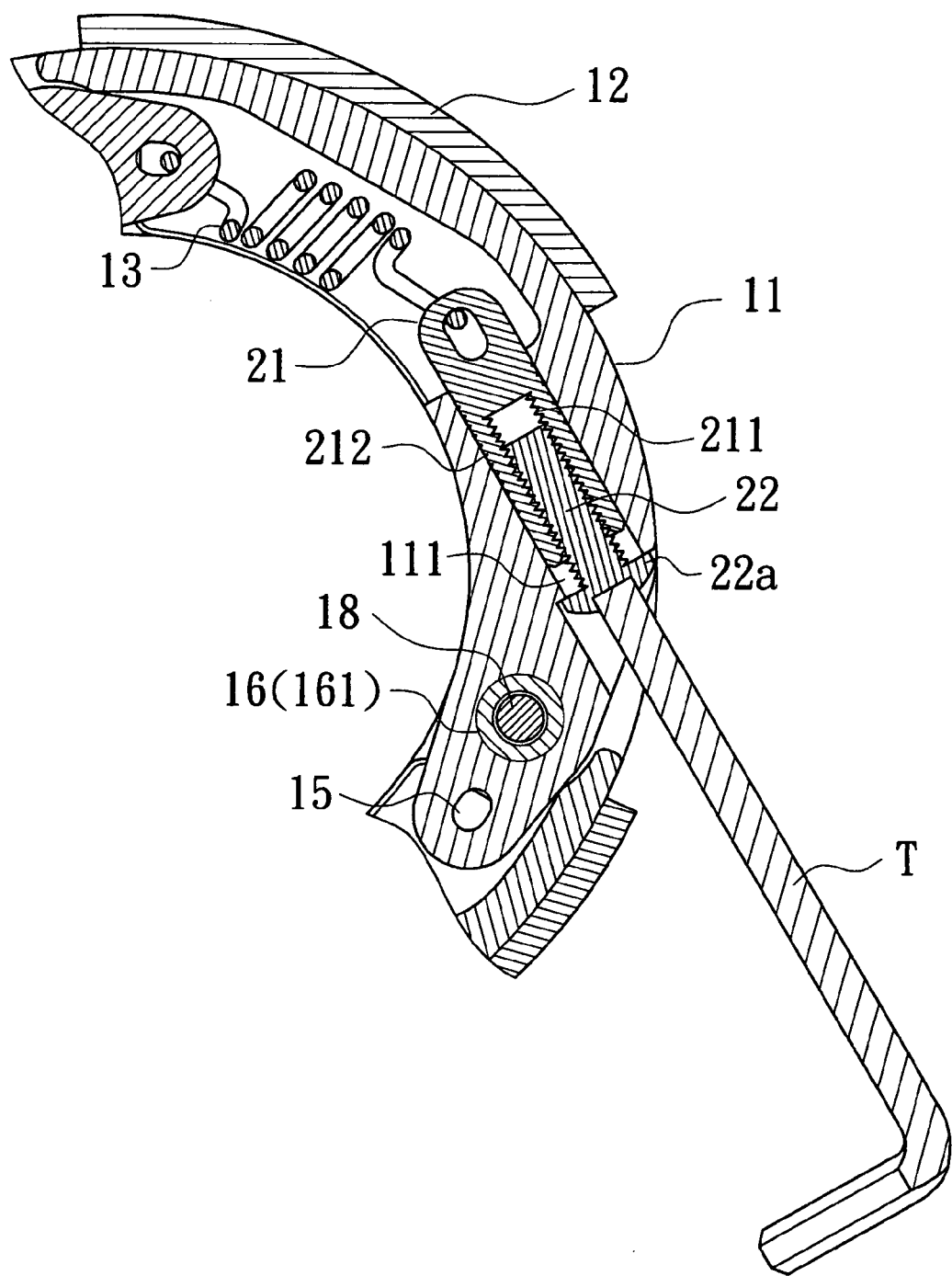
FIG. 4 is a sectional view similar to FIG. 3, illustrating adjustment of the clutch device.

Referring to FIGS. 3 and 4, in a case that any one of the springs 13 becomes slack after a period of time and thus requires adjustment, a tool T (such as a hexagonal wrench) can be used to drive the adjusting screw 22 on the associated centrifugal weight 11. As mentioned above, the associated spring-attaching member 21 moves along the longitudinal direction of the through-hole 111 of the associated centrifugal weight 11 when the adjusting screw 22 turns, thereby adjusting the tightness of the spring 13. This is because an end of the spring-attaching member 21 is attached to the other end of the associated spring 13. The scale 212 on the associated spring-attaching member 21 provides an indication of the extent of adjustment so that a worker may proceed with precise adjustment of the spring 13 to the required tightness. And the associated opening 112 of the body 1 allows the worker to view the scale 212 and thus to obtain precise adjustment. Preferably, each opening 111 of the body 11 extends along a longitudinal direction of the associated spring 13 to allow removal and replacement of the associated spring 13 via the opening 111. Thus, in a case that a spring 13 is broken, the associated opening 112 of the body 1 allows the worker to proceed with the replacement of a new spring without the need of dismantling the whole clutch device. This effectively simplifies the replacement and shortens the time for replacement.

Figure 2:
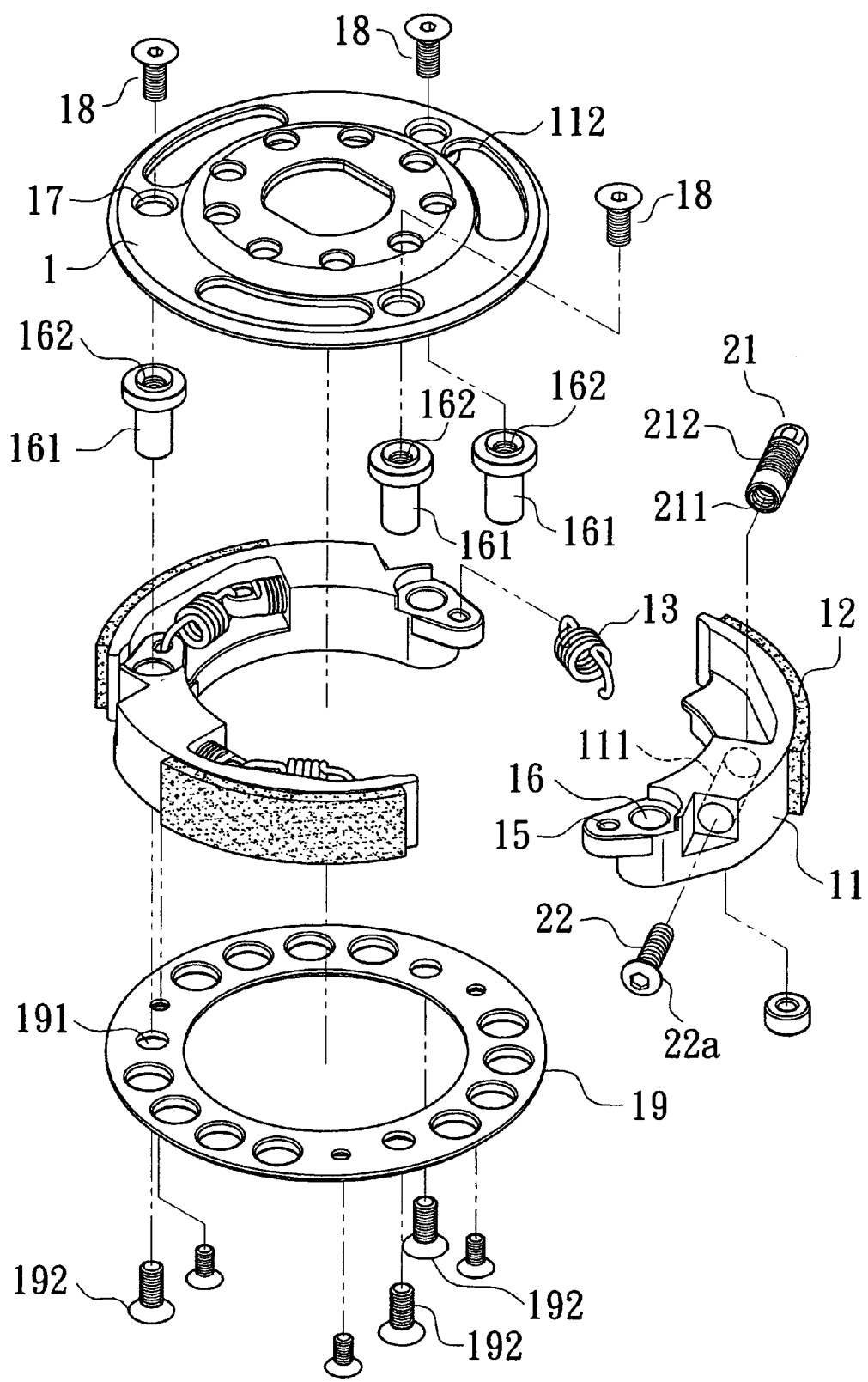
FIG. 2 is an exploded perspective view of the clutch device in accordance with the present invention.

Referring to FIGS. 1 and 2, the body 1 may further comprise a fixing ring 19 that includes a plurality of fixing holes 191 aligned with the screw holes 162 of the axles 161, with a screw 192 extending through each fixing hole 191 and the screw hole 162 of the associated axle 161 to thereby fix the fixing ring 19 to the axle 161 and the body 1. The strength of the body 1 is thus improved, which is advantageous to withstand larger torque during operation of the clutch.

Preferably, each adjusting screw 22 comprises an enlarged head 22a that abuts against a shoulder portion of the through-hole 111 of the associated centrifugal weight 11. Thus, when the adjusting screw 22 is turned by the tool T, the adjusting screw 22 turns freely without any longitudinal displacement along the longitudinal direction of the through-hole 111.

Although a specific embodiment has been illustrated and described, numerous modifications and variations are still possible without departing from the essence of the invention. The scope of the invention is limited by the accompanying claims.

What is claimed is:

1. A clutch device for a motorcycle, comprising:
a body comprising a side;
at least two centrifugal weights pivotably mounted on the side of the body, each of said at least two centrifugal weights comprising a clutch plate on an outer periphery face thereof, each of said at least two centrifugal weights further comprising a through-hole extending from an inner side thereof through the outer periphery face thereof;
a spring-attaching member mounted in the through-hole of each of said at least two centrifugal weights and comprising a first end and a second end that has a screw hole, an adjusting screw being mounted in each said spring-attaching member; and
at least two springs each comprising a first end attached to an associated one of said at least two centrifugal weights and a second end attached to the first end of the spring-attaching member on another one of said at least two centrifugal weights;
each said spring-attaching member moving along a longitudinal direction of an associated one of the through-holes when an associated one of the adjusting screws is turned, thereby adjusting tightness of an associated one of said at least two springs.

2. The clutch device for a motorcycle as claimed in claim 1 wherein each said spring-attaching member comprises a scale on an outer periphery thereof, and wherein the body comprises a plurality of openings respectively aligned with the scales of the spring-attaching members.

3. The clutch device for a motorcycle as claimed in claim 2 wherein each said opening of the body extends along a longitudinal direction of an associated one of said at least two springs to allow removal and replacement of the associated one of said at least two springs via said opening.

4. The clutch device for a motorcycle as claimed in claim 1 wherein the through-hole of each of said at least two centrifugal weights comprises a shoulder portion, and wherein each said adjusting screw comprises an enlarged head that abuts against the shoulder portion of the through-hole of an associated one of said at least two centrifugal weights.

5. The clutch device for a motorcycle as claimed in claim 1 further comprising a fixing ring fixed to another side of the body.

* * * * *